US012756780B2

(12) United States Patent
Pope et al.

(10) Patent No.: US 12,756,780 B2
(45) Date of Patent: Oct. 6, 2026

(54) METHOD/SYSTEM TO CONVERT TEXT-TO-VOICE / VOICE-TO-TEXT IN SERVICE OF EMERGENCY COMMUNICATIONS

(71) Applicant: Intrado Life & Safety, Inc., Longmont, CO (US)

(72) Inventors: Adan K. Pope, Riverside, IL (US); Michel Brkovic, St-Eustache (CA)

(73) Assignee: Intrado Life & Safety, Inc., Longmont, CO (US)

( * ) Notice: Subject to any disclaimer, the term of this patent is extended or adjusted under 35 U.S.C. 154(b) by 284 days.

(21) Appl. No.: 18/236,746

(22) Filed: Aug. 22, 2023

(65) Prior Publication Data

US 2025/0071204 A1 Feb. 27, 2025

(51) Int. Cl.
*H04M 3/51* (2006.01)
*G06F 40/40* (2020.01)
*H04W 4/90* (2018.01)

(52) U.S. Cl.
CPC ........... *H04M 3/5116* (2013.01); *G06F 40/40* (2020.01); *H04W 4/90* (2018.02)

(58) Field of Classification Search
CPC ........ H04M 3/5116; H04W 4/90; G06F 40/40
USPC ........................................................ 455/404.1
See application file for complete search history.

(56) References Cited

U.S. PATENT DOCUMENTS

2010/0261448 A1* 10/2010 Peters ..................... H04W 4/90 455/466
2014/0122109 A1* 5/2014 Ghanbari ............... G16H 10/20 705/2
2017/0366954 A1* 12/2017 Sabeur .................... H04W 8/12
2022/0201456 A1* 6/2022 Chiang ................... G06F 40/58

* cited by examiner

*Primary Examiner* — Maria El-Zoobi
(74) *Attorney, Agent, or Firm* — PATENT CAPITAL GROUP

(57) ABSTRACT

A method includes receiving an emergency request, the emergency request including a first text message and a geolocation; determining a call center, at least in part based on the geolocation; converting content of the first text message to a first voice message; and transmitting the first voice message to the call center.

20 Claims, 5 Drawing Sheets

METHOD/SYSTEM TO CONVERT TEXT-TO-VOICE / VOICE-TO-TEXT IN SERVICE OF EMERGENCY COMMUNICATIONS

BACKGROUND

Technical Field

This disclosure relates to speech-to-text systems and, in particular, to converting text-to-speech and speech-to-text in service of emergency communications.

Related Art

Existing conversions of text-to-911 are expensive and time-consuming. Given low adoption rate, relay centers literally read out texts to call centers. Text enablement in emergency call centers (ECCs) is relatively low in the US and almost non-existent worldwide.

Increasingly, satellite communications are being launched in low orbit to facilitate internet access and emergency communications access services.

BRIEF SUMMARY

In a first implementation of the present disclosure, a method includes receiving an emergency request, the emergency request including a first text message and a geolocation; determining a call center, at least in part based on the geolocation; converting content of the first text message to a first voice message; and transmitting the first voice message to the call center.

A second implementation is the first implementation, further comprising: receiving a registration request identifying a jurisdiction of the call center, wherein the determining is performed at least in part based on the jurisdiction of the call center.

A third implementation is any of the first or second implementations, further comprising: standardizing the first text message to a key event to extract the content.

A fourth implementation is the second implementation, further comprising: determining a language of the call center, at least in part based on the registration request; and translating the content to the language of the call center, wherein the first voice message is in the language of the call center.

A fifth implementation is any of the first through fourth implementations, further comprising: receiving an emergency response including a second voice message.

A sixth implementation is the fifth implementation, further comprising: converting the second voice message to a second text message.

A seventh implementation is the sixth implementation, further comprising: transmitting the second text message to an address, wherein the emergency request identifies the address.

In an eighth implementation, an apparatus includes a network interface that receives an emergency request, the emergency request including a first text message and a geolocation; and a processor configured to determine a call center, at least in part based on the geolocation and to convert content of the first text message to a first voice message, wherein the network interface transmits the first voice message to the call center.

A ninth implementation is the eighth implementation, wherein the network interface receives a registration request identifying a jurisdiction of the call center, and the processor determines the call center at least in part based on the jurisdiction of the call center.

A tenth implementation is any of the seventh or eighth implementations, wherein the processor further is configured to standardize the first text message to a key event to extract the content.

An eleventh implementation is the ninth implementation, wherein the processor further is configured to determine a language of the call center, at least in part based on the registration request, and to translate the content to the language of the call center, and the first voice message is in the language of the call center.

A twelfth implementation is any of the eighth through eleventh implementations, wherein the network interface receives an emergency response including a second voice message.

A thirteenth implementation is the twelfth implementation, wherein the processor further is configured to convert the second voice message to a second text message.

A fourteenth implementation is the thirteenth implementation, wherein the network interface transmits the second text message to an address, and the emergency request identifies the address.

In a fifteenth implementation, a computer-readable medium includes instructions that, when executed by a processor, perform operations comprising: determining a call center, at least in part based on a geolocation, wherein a network interface receives an emergency request, the emergency request including a first text message and the geolocation; and converting content of the first text message to a first voice message, wherein the network interface transmits the first voice message to the call center.

A sixteenth implementation is the fifteenth implementation, wherein the network interface receives a registration request identifying a jurisdiction of the call center, and the determining is performed at least in part based on the jurisdiction of the call center.

A seventeenth implementation is any of the fifteenth or sixteenth implementations, the operations further comprising: standardizing the first text message to a key event to extract the content.

An eighteenth implementation is the sixteenth implementation, the operations further comprising: determining a language of the call center, at least in part based on the registration request; and translating the content to the language of the call center, wherein the first voice message is in the language of the call center.

A nineteenth implementation is any of the fifteenth through eighteenth implementations, wherein the network interface receives an emergency response including a second voice message.

A twentieth implementation is the nineteenth implementation, the operations further comprising: converting the second voice message to a second text message.

A twenty-first implementation is the twentieth implementation, the operations further comprising: transmitting the second text message to an address, wherein the emergency request identifies the address.

In a twenty-second implementation, an apparatus includes means for receiving an emergency request, the emergency request including a first text message and a geolocation; means for determining a call center, at least in part based on the geolocation; means for converting content of the first text message to a first voice message; and means for transmitting the first voice message to the call center.

A twenty-third implementation is the twenty-second implementation, further comprising: means for receiving a registration request identifying a jurisdiction of the call center, wherein the determining is performed at least in part based on the jurisdiction of the call center.

A twenty-fourth implementation is any of the twenty-second or twenty-third implementations, further comprising: means for standardizing the first text message to a key event to extract the content.

A twenty-fifth implementation is the twenty-third implementation, further comprising: means for determining a language of the call center, at least in part based on the registration request; and means for translating the content to the language of the call center, wherein the first voice message is in the language of the call center.

A twenty-sixth implementation is any of the twenty-second through twenty-fifth implementations, further comprising: means for receiving an emergency response including a second voice message.

A twenty-seventh implementation is the twenty-sixth implementation, further comprising: means for converting the second voice message to a second text message.

A twenty-eighth implementation is the twenty-seventh implementation, further comprising: means for transmitting the second text message to an address, wherein the emergency request identifies the address.

DETAILED DESCRIPTION

Given the nature of satellite communication latency and bandwidth, it is expected that text will be the predominant form for requesting help in times of emergencies.

Text messages can involve informal language, punctuation, and/or abbreviations/acronyms. So, it can be difficult for a call taker at the call center 150, who might be unfamiliar with such informalities, to comprehend a text message, particularly within the context of a time-sensitive emergency. Because the call taker might be unable to clarify or confirm their understanding, it is critical to receive as much information as possible from a single text message.

In addition, many call centers cannot receive text messages. Thus, interacting with the call center can be conducted via voice communication/

Figure 1:
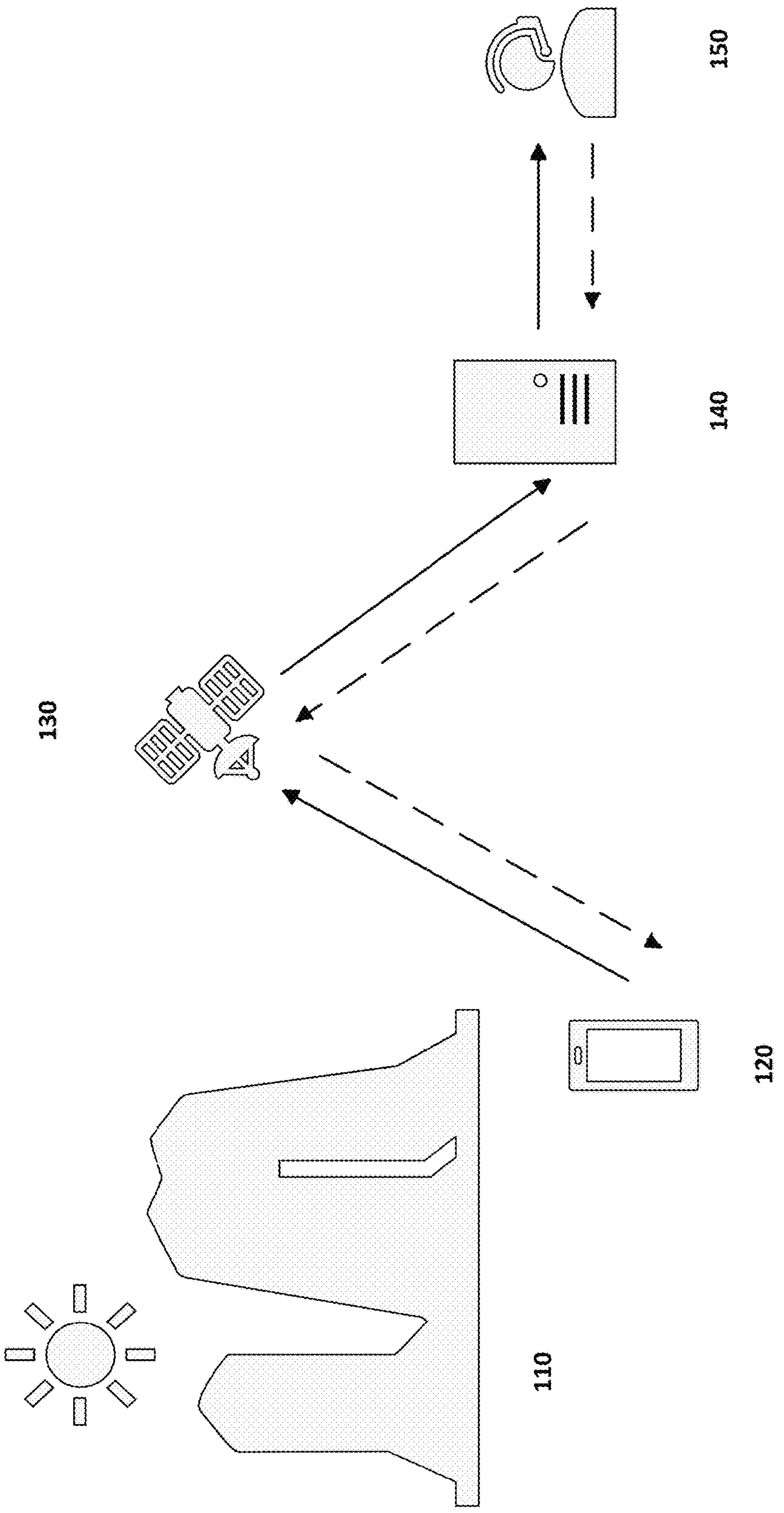
FIG. 1 illustrates a potential emergency situation involving text communications, according to an implementation of the present disclosure.

FIG. 1 illustrates a potential emergency situation involving text communications, according to an implementation of the present disclosure. The situation illustrated in FIG. 1 includes a location 110, a device 120, a satellite 130, a server 140, and a call center 150.

Initially, the call center 150 has registered with the server 140 to indicate a spoken language that is understood at the call center 150. In some implementations, the call center has also registered a jurisdiction served by the call center 150. In the example of FIG. 1, this jurisdiction includes the location 110.

A texter (e.g., a human user) uses the device 120 to send a text relating to the potential emergency situation, such as an injury that occurred at location 110. The device 120 is, for example, a mobile telephone, smartwatch, tablet computer, or phablet. Because the location 110 is remote, the texter might be unable to transmit a telephone call. Further, even if it is possible to make a telephone call, the latency of such a call is heightened. Thus, the device 120 can wirelessly transmit a text message to perform communication, often with lower latency.

In the illustrated implementation, the satellite 130 wirelessly receives the text message from the device 120. In many implementations, the satellite 130 can determine a geolocation, such as GPS coordinates, of the device 120. The satellite 130 then can create a payload including the text message and the geolocation, and relay the payload to the server 140.

The server 140 can receive the text message and GPS coordinates from the satellite 130. In many implementations, the server 140 is ground-based, although the server 140 is in orbit in at least one implementation.

The server 140 can standardize the text message. For example, the server 140 can perform text recognition on the text message to determine the key event (e.g., an injury, a fire, a burglary). The server 140 can then determine additional fields, based on the key event. As used herein, to "standardize" is inclusive of performing any storing, reading, processing, writing, and/or transmitting of the text message, whether by adding additional detail or summarization, in accordance with the design of any system.

In some implementations, the server 140 performs this standardization with a template. So, for example, the server 140 can determine the template, based on the key event. Then, based on the template, the server 140 can determine the additional fields.

Thus, in various implementations, the server 140 can perform text recognition on the text message to determine the texter's name, location, the key event, and whether the situation is an emergency.

In some implementations, the server 140 can recognize the texter's name based on the text message and a dictionary of names. In a few implementations, the server 140 can retrieve the texter's name from a registration in an app in which the texter sent the text. For example, one such app is Safety Shield available from Intrado.

The server 140 can determine the texter's location based on the GPS coordinates received from the satellite 130. In some implementations, the server 140 can supplement the texter's location with a location included in a registration in an app. Thus, although the registered location might not reflect the texter's current location, the registered location might provide additional context to a first responder. For example, while the GPS coordinates might indicate the texter's current location (e.g., in a national park), the registered location can explain the direction of approach (e.g., which entrance of the national park was used by the texter).

The server 140 can determine the key event based on a dictionary of key events (e.g., "fire"), a thesaurus of key events (e.g., "flames"), and/or a database that links words to key events.

In many implementations, the server 140 can supplement the determination of the key event with additional words in the text message. For example, the key event for the word "burning" might be ambiguous, based on what is burning.

Thus, in one example, the server 140 recognizes the word "wound" in the same sentence or other proximity to the word "burning." As a further example, the server 140 can distinguish between the word "house" being the subject of a sentence involving the verb "burning" (e.g., more likely related to a fire and medical emergency), rather than the word "house" being the direct object of the verb "burning" (e.g., more likely related to arson, a fire and police emergency).

Thus, in a first stage, the server 140 can determine a template, based on a key event such as "fire" or "burglary." Then, in a second stage, the server 140 can determine additional fields relevant to the key event. For example, if the key event is "burglary," the server 140 can recognize text in the text message relating to whether a weapon is present.

This staged determination can improve the accuracy of the recognition of the content for the additional fields. For example, in one implementation, the server 140 gives equal weighting to words, such that the server 140 assumes any text including the word "car" refers to a traffic accident. However, in other implementations, the server 140 first determines that the event is "burglary" and then determines that reference to the word "car" can relate to the mode of transportation used by the burglars.

In addition, the staged determination can improve the speed at which the content for the additional fields is recognized, because the server 140 recognizes the content for a particular context. For example, in one implementation, the server 140 can scan the text message for many words in a dictionary, although some of these words might be irrelevant for a particular context. However, in other implementations, the server 140 can determine that the key event is "burglary" and then scan the text message for fewer words relating to fields like "weapon," rather than words or phrases relating to unrelated emergencies like "giv* birth," which uses a wildcard symbol.

The server 140 can also determine whether the message relates to an emergency. In one example, the server 140 determines whether the text message relates to obvious prank, crank, or other joke texts. For example, just as people sometimes call emergency numbers like 911 to order a pizza, people might try texting an emergency number to order a pizza. Thus, the server 140 can determine that the text message includes such content (e.g., the word "pepperoni" or even "pizza") and not convert the text message to a voice message, upon such a determination. Similarly, the server 140 can determine other words or word combinations (e.g., "refrigerator" and "running") and likewise not convert such text messages to a voice message.

Further, texters often do not provide a clear indication as to whether there is an emergency. Texters might have an inability to discern an emergency situation (e.g., the administration of epinephrine) from a non-emergency situation (e.g., a typical asthma attack or croup), particularly because of similarities between those situations. Thus, in various implementations, the server 140 can determine that the text message relates to a relevant situation but does not rise to the level of an emergency.

For example, the server 140 can determine the text includes the word "croup," which is often a cause for concern but does not often rise to the level of a true emergency. Thus, the server 140 can direct the text (or a voice message created from the text) to a relevant destination. Such a destination might be, for example, the non-emergency line for a firehouse. Thus, the server 140 can determine not to transmit the voice message to the call center 150 and, in some instances, not create the voice message.

Thus, the server 140 can address a situation in which people use different words, based on their educational level, country of origin, and age, for example.

Of course, Intrado believes safety is paramount, and, in some implementations, the server 140 provides for an override. For example, if the text message includes the word "emergency," then the server 140 can determine that the situation is, in fact, an emergency. Thus, the server 140 can create a voice message based on the text message and forward it to the call center 150.

Further, the server 140 can determine the call center 150 that services the location 110, based on, for example, the GPS coordinates received in the payload from the satellite 130. One company capable of providing such a determination is Intrado Corporation.

In many implementations, the server 140 can determine whether the call center 150 has the capability to communicate via text message. This determination, as well as the determination as to whether the call center 150 services the location 110, can be based on a prior registration of the call center 150.

If the server 140 determines that the call center 150 has the capability to communicate via text message, then the server 140 can forward the text message to the call center 150.

In some implementations, the server 140 can produce an annotation of the text message with additional information. The additional information can be, for example, meanings of acronyms included in the text message. In an implementation in which the server 140 has additional information regarding the texter (e.g., because the texter has registered with a mobile app served by the server 140), then the server 140 can include that additional information in the annotation. The server 140 can then transmit the annotation to the call center 150.

If the server 140 determines that the call center 150 does not have the capability to communicate via text message, then the server 140 can then create a voice message based on the text message. In many implementations, the voice message is based on the template and the additional fields. The server 140 can create the voice message based on text-to-voice technology. The server 140 can annotate the voice message, such as with the text message itself or the templated text message.

The server 140 then forwards the voice message to the determined call center 150.

The call center 150 receives the voice message from the server 140. The voice message can be received over a standard telephone line or a voice over Internet protocol (VOIP) call, for instance. The call center 150 can then dispatch an emergency service to the location 110.

The voice message can include an audible explanation of the geolocation of the location 110, such as "Mile 10 of Skyline Drive." However, there are some shortcomings in text-to-speech synthesis, such that the voice message might mispronounce the location (e.g., Versailles, KY). In another situation, the call taker simply might misunderstand the unnatural voice. In other situations, even if the text-to-speech synthesis is flawless, the information might be substantially meaningless to a human (e.g., GPS coordinates of 38.0526° N, 84.7299° W). Thus, in some implementations, the server 140 transmits the information in the template with the call, such that the call center can use the information without relying on the call taker's transcription or understanding.

Although this explanation covers the situation in which the dispatch can occur based on a single text message, many implementations grant the call taker the ability to communicate back to the device 120. Some such implementations transmit an acknowledgement or instructions to handle the emergency (e.g., "begin chest compressions").

In other situations, the call taker might request clarification from the texter. In such a situation, even if it technologically is possible for the device 120 to receive a voice call from the call taker, the situation in which the texter is in might deteriorate if the device 120 receives a voice call. Therefore, continuing a text conversation with the texter might be preferable. However, as before, the call center 150 might not have text capabilities.

In such a situation, the call taker can record a reply voice message. The call center 150 can transmit the reply voice message, and the server 140 can receive the reply voice message.

The server 140 can then convert the reply voice message to at least one reply text message based on speech-to-text technology. In many implementations, the server 140 converts the reply voice message to more than one text message because the mobile service of device 120 might use a reduced length of text message (e.g., 160 characters). Similarly, the server 140 can edit the text to remove speech disfluencies (e.g., "um" and "ah") and/or stuttering.

The server 140 then wirelessly transmits the at least one reply text message.

The satellite 130 wirelessly receives the at least one reply text message. The satellite 130 then transmits (e.g., relays) the at least one reply text message.

The device 120 wirelessly receives the at least one reply text message. The device 120 can then output (e.g., display or convert to speech) the at least one reply text message to the texter.

In a case in which the texter begins a dialogue with the call center 150 by sending a reply to the at least one reply text message, operations similar to the foregoing can be performed.

Thus, several implementations establish a system that listens to a text stream in the time of a request for assistance. The system can convert the text to voice, should the ECC not have the capability to communicate via text. The system also can conduct a two-way conversation by converting reply speech into text and transmitting the text to the device 120.

In another example, a security alarm occurs in a home covered by an alarm monitoring service, such as that provided by ADT Inc. of Boca Raton, FL. Upon receiving notification of the alarm, the alarm monitoring service sends a text. The text includes the location of the home, as well as an indication that the security alarm has occurred.

The system can receive (e.g., intercept) the text. The system can determine which call center generally serves the location of the home. In one implementation, the system can determine which call center particularly serves the location of the home for the purpose of an alarm (e.g., for police coverage). Thus, the system can recognize that an ECC that serves one type of emergency (e.g., fire) for a particular location might not serve the same location for a different type of emergency (e.g., police).

The system also can determine the key event, based on the indication in the text. In this example, the key event is the security alarm. Thus, the system can determine that the key event relates to police services.

In various implementations, the system can eliminate any non-relevant items in the communication. For example, the text from the security alarm company might include information like an identification of the alarm monitoring service. Because the identity of the alarm monitoring service is not relevant to addressing the emergency at the home, the system can ignore this identity upon creating a voice message.

In some implementations, the system can produce an annotation including additional fields, based on the determination that the key event is the security alarm. In an example implementation, an additional field identifies a particular point of entry (e.g., "front window" or "back door") identified by the alarm monitoring service.

The annotation can include a URL for the incident identifier. The alarm monitoring system can include the URL in its text message, or the system can generate the URL. In an implementation in which the system generates the URL, the system can include at the URL destination (e.g., the web page) information associated with the location. For example, the URL destination can include information regarding times, dates, and locations of previous security alarms at the same location.

The system can then apply text-to-speech technology on the text message (e.g., although ignoring non-relevant items) to produce a voice message. The system can then send the voice message to an administration line of the ECC. The voice message states the security alarm is taking place. The voice message also can describe the alarm, although in some instances, the annotation additionally or alternatively can describe the alarm. The system can then hang up the call.

In some implementations, the system can ask for the ECC to acknowledge receipt. This acknowledgement can be provided electronically, such as by a tone generated by the ECC. In other implementations, this acknowledgement can be performed vocally by a call taker. Because the system can recognize that the vocalization is an acknowledgement, rather than instructions for the emergency, the system does not necessarily convert the vocalization to a text. Thus, in most implementations, the system does not transmit the acknowledgement to the security alarm company or the home.

In various implementations, the system can recognize basic verbal commands from the call taker. For example, the system can recognize phrases like "repeat" or "pause" and repeat the voice message or pause delivery of the voice message, respectively.

To aid in receiving proper instructions, the system can provide a menu in response to receiving the command "help" from the call taker. Further, the system can append a menu at the end of the voice message. Of course, the system can provide the menu at the beginning or some other portion of the voice message, although such an implementation might delay delivery of critical emergency information.

Figure 2:
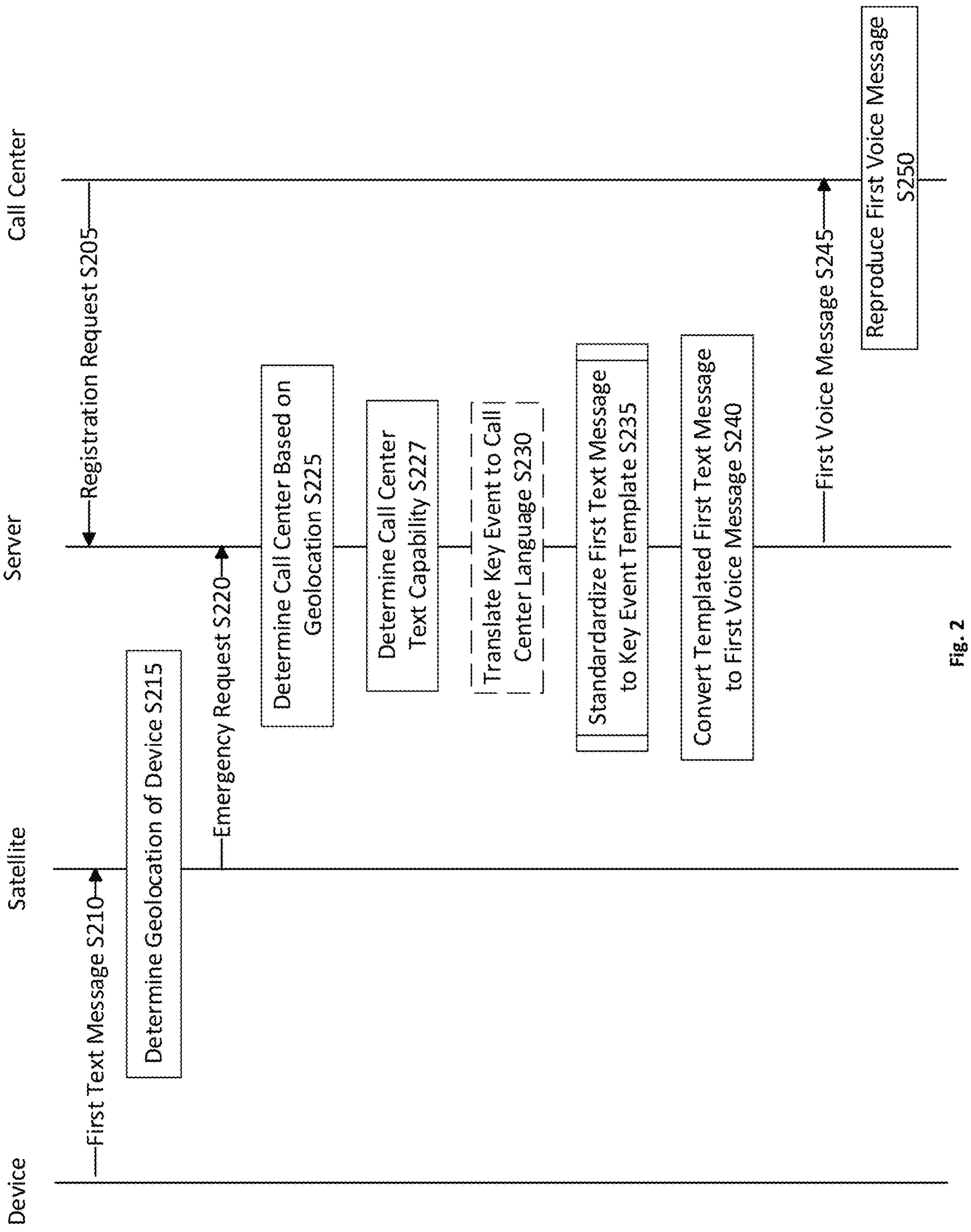
FIG. 2 illustrates a signal flow diagram, according to an implementation of the present disclosure.

FIG. 2 illustrates a signal flow diagram, according to an implementation of the present disclosure. At S205, the call center transmits a registration request to the server. The registration request can include, for example, one or more telephone numbers for the call center, a jurisdiction served by the call center (e.g., including the location from which the user device later calls), and a spoken language understood at the call center.

At S210, a device (e.g., device 120) at a location (e.g., location 110) wirelessly transmits a first text message indicating a situation. A satellite (e.g., satellite 130) receives the text message.

At S215, the satellite determines a geolocation of the location. The satellite can determine the geolocation based on triangulation, for example.

The geolocation can be expressed in GNSS coordinates. The GNSS system can be or comply with the Global Positioning System (GPS), Global Navigation Satellite System (GLONASS), BeiDou Navigation Satellite System, Galileo, Quasi-Zenith Satellite System (QZSS), or the Indian Regional Navigation Satellite System (IRNSS), as examples.

The satellite produces a payload including the text message and the geolocation. The satellite transmits the payload in an emergency request at S220. The server (e.g., server 140) receives the emergency request.

In S225, the server determines the key event from the text of the text message and determines the call center that serves the location, based on the geolocation included in the payload.

In S227, the server can determine whether the call center has the capability to receive a text message. In many implementations, this determination is based on the registration request received at S205. If the server determines that the call center has the capability to receive a text message, then the server can transmit the text message to the call center. In some implementations, the server can annotate the text message, such as with the template discussed below.

Further, in some implementations, the server determines whether the call center has the capability to receive a text message by simply sending the text message to the call center (e.g., public safety access point [PSAP]). If the call center does not send an acknowledgement, then the server determines the call center does not have the capability to receive text messages.

In S230, the server optionally translates the key event into a spoken language understood at the call center. In many implementations, this translation is based on a language identified in the registration request received at S205.

In S235, the server standardizes the first text message to a template, based on the key event. This standardization is discussed in more detail in connection with FIG. 4. In addition, the server can determine whether the text message relates to an emergency. As discussed above, if the text message does not relate to an emergency (e.g., is a prank pizza order), then the server can simply ignore the text message without performing additional processing.

In S240, if the server determines that the call center does not have the capability to receive a text message, the server converts the first text message in the form of a key event template to a first voice message. In addition, the server can annotate the first voice message with the first text message itself.

In S245, the server transmits the first voice message and any annotation. The call center receives the first voice message and the annotation, if any. This transmission can be via an administrative line. However, if the server determines there is a real emergency in S235, the alarm transmits the first voice message to an emergency line.

In S250, the call center can audibly reproduce the first voice message in a spoken language understood by a call taker.

Although S205 is illustrated as chronologically first in FIG. 2, some implementations do not perform S205 first. For example, S205 can be performed at any point prior to S225.

Figure 3:
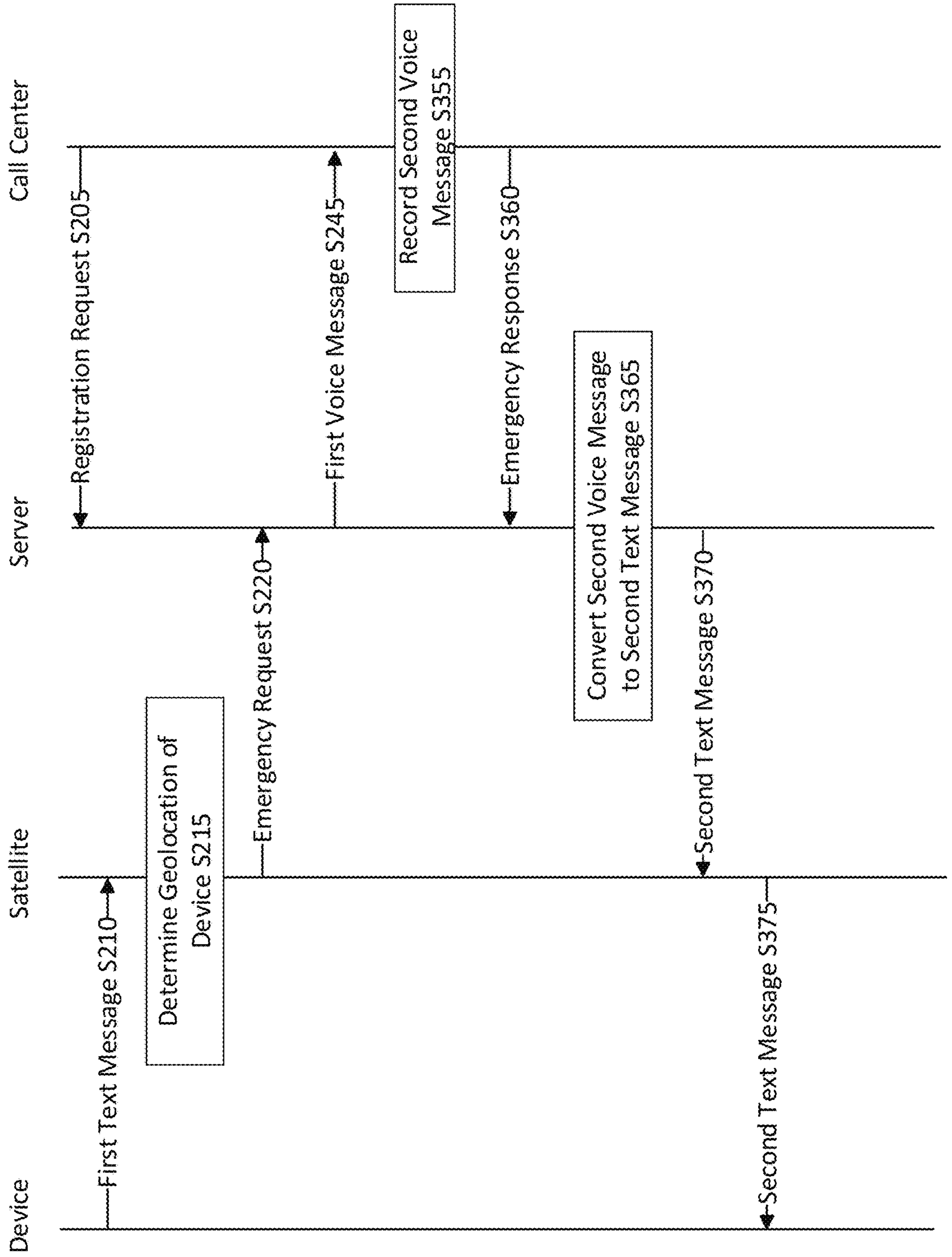
FIG. 3 illustrates a signal flow diagram, according to an implementation of the present disclosure.

FIG. 3 illustrates a signal flow diagram, according to an implementation of the present disclosure. FIG. 3 includes a portion of the operations of FIG. 2 for context. It is specifically contemplated that FIG. 3 can include any or all of the operations of FIG. 2.

Operations in FIG. 3 with the same reference numeral as in FIG. 2 are performed substantially the same. Thus, description will begin with S355.

In S355, the call taker at the call center records a second voice message to provide instructions or request clarification, for example.

In S360, the call center transmits an emergency response including the second voice message. The server receives the emergency response.

In S365, the server converts the second voice message into a second text message using speech-to-text technology.

In S370, the server wirelessly transmits the second text message. The satellite wirelessly receives the second text message.

In S375, the satellite wirelessly transmits the second text message. The device then wirelessly receives the second text message.

Figure 4:
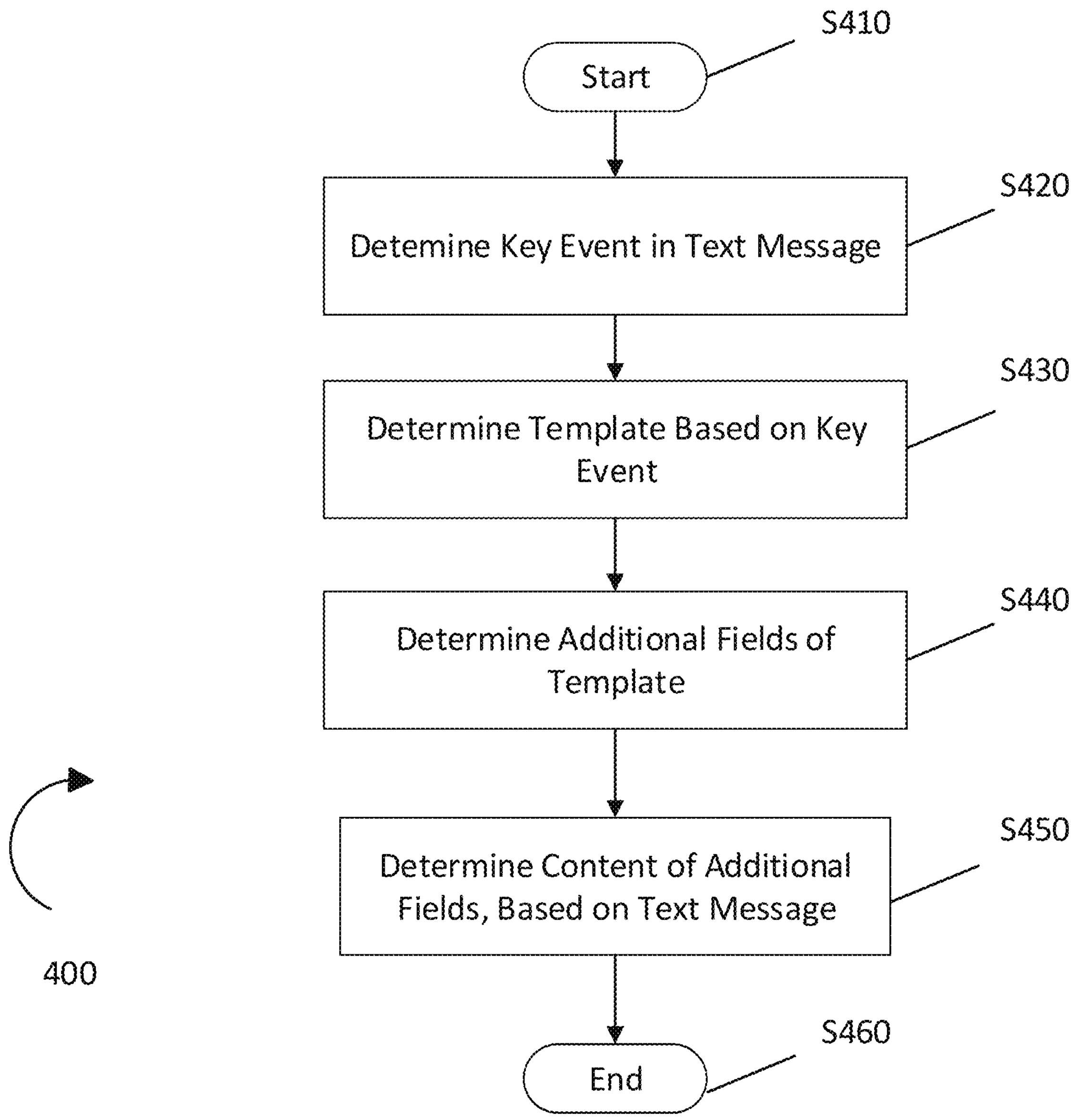
FIG. 4 illustrates an algorithm for standardizing a text message to a key event template, according to an implementation of the present disclosure.

FIG. 4 illustrates an algorithm 400 for standardizing a text message to a key event template, according to an implementation of the present disclosure. In many implementations, the algorithm 400 is implemented by a server (e.g., server 140). The algorithm 400 begins at S410 and advances to S420.

In S420, the server determines a key event in a text message. For example, the server determines the key event based on a dictionary of key events. In several implementations, the server recognizes the key event based on a verb in the text message. The algorithm 400 then advances to S430.

In S430, the server determines a template based on the key event determined in S420. The algorithm 400 then advances to S440.

In S440, the server determines additional fields of the template. The algorithm 400 then advances to S450.

In S450, the server determines content of the additional fields, by recognizing text in the text message. The algorithm 400 then advances to S460.

In S460, the algorithm 400 concludes.

At least one example of this disclosure was written in consideration of the text being sent from a remote location and subsequently being relayed via satellite. Although implementations of the present disclosure can be particularly advantageous in such a situation, nothing in this disclosure should be construed as limiting the teachings of the disclosure to such a situation.

For example, the location 110 is not necessarily remote. In other words, in the example of FIG. 1, the device 120 might have sent a text, rather than made a telephone call, due to current technology implementations. However, the device 120 also can send the text for any reason. For example, a human user might simply find a text to be more convenient or clearer.

As another example, the text message can be relayed to the server 140 without the involvement of the satellite 130. For example, the text message can be relayed using a cellular service.

Further, some benefits of the disclosure can be achieved in these other situations. For example, a criminal at an emergency scene might threaten or attack a person, if the criminal hears the person speak. Thus, there can be a benefit to using a text system, even if the location 110 is not remote. Similarly, such a benefit might inure, even without the involvement of the satellite 130.

Additionally, in the present disclosure, the messaging performed was described as being a “text message.” However, the messaging is not limited to formats that conform to the Short Message Service (SMS). In various implementations, the message can comply with the Multimedia Messaging Service (MMS), iMessage, or the Rich Communication Service (RCS).

Figure 5:
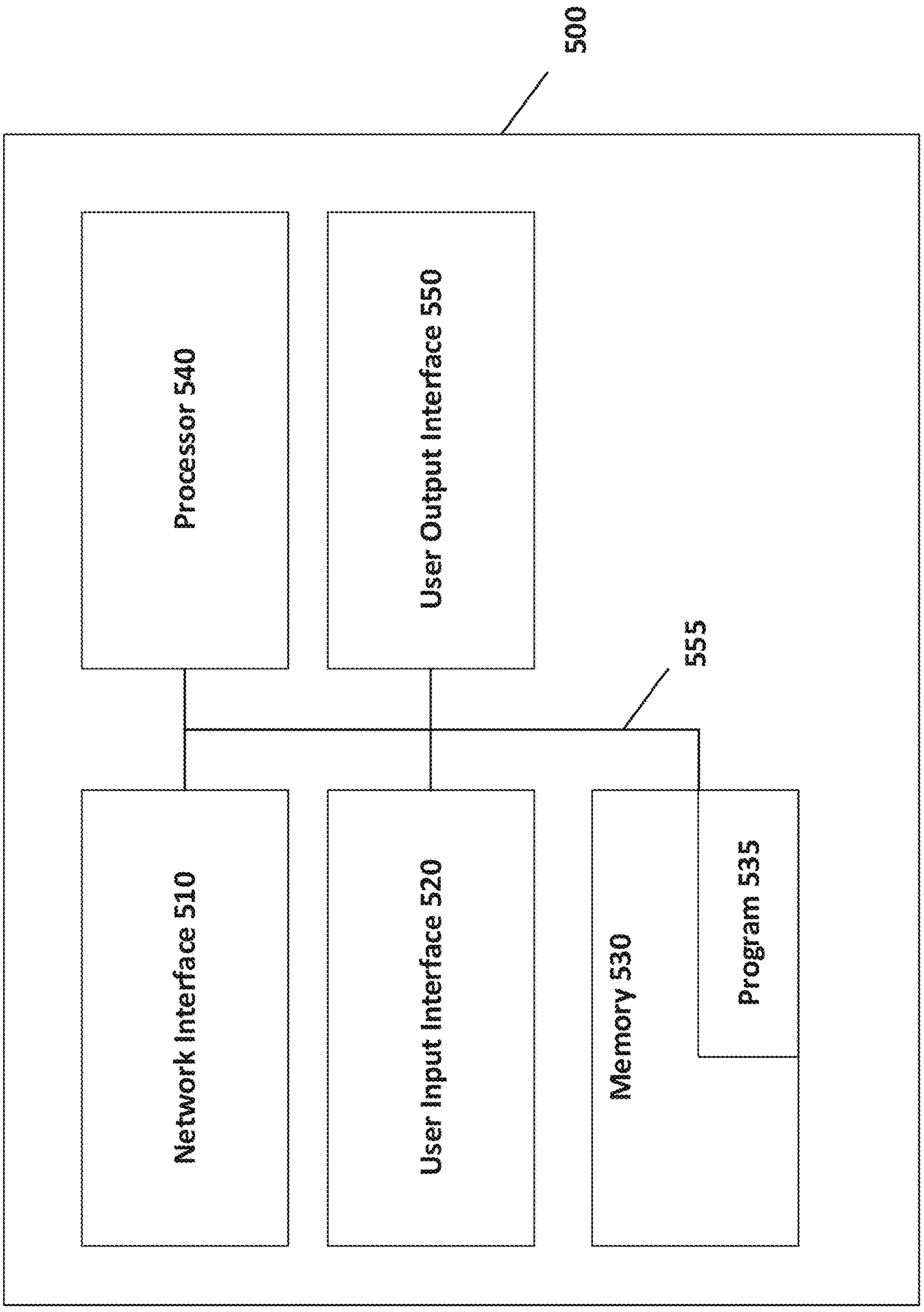
FIG. 5 illustrates a computing device, according to an implementation of the present disclosure.

FIG. 5 illustrates a computing device 500, according to an implementation of the present disclosure. The device 120 and/or the server 140 can be implemented by the computing device 500.

The computing device 500 can include a network interface 510, a user input interface 520, a memory 530, a program 535, a processor 540, a user output interface 550, and a bus 555.

Although illustrated within a single housing, the computing device 500 can be distributed across plural housings or sub-systems that cooperate in executing program instructions. In some implementations, the computing device 500 can include one or more blade server devices, standalone server devices, personal computers (including laptop computers and tablet computers), routers, hubs, switches, bridges, firewall devices, intrusion detection devices, mainframe computers, network-attached storage devices, smartphones and other mobile telephones, and other computing devices. Although the system executes the Windows OS, macOS, or Linux in many implementations, the system hardware can be configured according to a Symmetric Multi-Processing (SMP) architecture or a Non-Uniform Memory Access (NUMA) architecture.

The network interface 510 provides one or more communication connections and/or one or more devices that allow for communication between the computing device 500 and other computing systems (not shown) over a communication network, collection of networks (not shown), or the air, to support the conversion of text-to-voice/voice-to-text in service of emergency communications, outlined herein. The network interface can communicate using various networks (including both internal and external networks) such as near-field communications (NFC), Wi-Fi™, Bluetooth, Ethernet, cellular (e.g., 3G, 4G, 5G), white space, 802.11x, satellite, Bluetooth, LTE, GSM/HSPA, CDMA/EVDO, DSRC, CAN, GPS, facsimile, or any other wired or wireless interface. Other interfaces can include physical ports (e.g., Ethernet, USB, HDMI, etc.), interfaces for wired and wireless internal subsystems, and the like. Similarly, nodes and user equipment (e.g., mobile devices) of the system can also include suitable interfaces for receiving, transmitting, and/or otherwise communicating data or information in a network environment.

The user input interface 520 can receive one or more inputs from a human. The user input interface can be or include a mouse, a touchpad, a keyboard, a touchscreen, a trackball, a camera, a microphone, a joystick, a game controller, a scanner, or any other input device.

The memory 530, also termed a "storage," can include or be one or more computer-readable storage media readable by the processor 540 and that store software. The memory 530 can be implemented as one storage device or across multiple co-located or distributed storage devices or subsystems. The memory 530 can include additional elements, such as a controller, that communicate with the processor 540. The memory 530 can also include storage devices and/or sub-systems on which data and/or instructions are stored. The computing device 500 can access one or more storage resources to access information to carry out any of the processes indicated in this disclosure and, in particular, FIGS. 2-4. In various implementations, the memory 530 stores the program 535 to execute at least a portion of the algorithms illustrated in FIGS. 2-4. Further, the program 535, when executed by the computing device 500 generally and/or the processor 540 specifically, can direct, among other functions, performance of the operations of conversion of text-to-voice/voice-to-text in service of emergency communications, as described herein.

The memory 530 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a field programmable gate array (FPGA), a hard drive, a cache memory, a flash memory, a removable disk, or a tape reel. The memory 530 can be or include resistive RAM (RRAM) or a magneto-resistive RAM (MRAM). The information being tracked, sent, received, or stored in the communication system can be provided in any database, register, table, cache, queue, control list, or storage structure, based on particular implementations, all of which could be referenced in any suitable timeframe.

The processor 540 (e.g., a processing unit) can be or include one or more hardware processors and/or other circuitry that retrieve and execute software, especially the program 530, from the memory 530. The processor 540 can be implemented within one processing device, chip, or package and can also be distributed across multiple processing devices, chips, packages, or sub-systems that cooperate. In some implementations, the processor 540 is or includes a Graphics Processing Unit (GPU).

The processor 540 can have any register size, such as a 32-bit register or a 64-bit register, among others. The processor 540 can include multiple cores. Implementations of the processor 540 are not limited to any particular number of threads. The processor 540 can be fabricated by any process technology, such as 14 nm process technology.

The user output interface 550 outputs information to a human user. The user output interface 550 can be or include a display (e.g., a screen), a touchscreen, speakers, a printer, or a haptic feedback unit. In many implementations, the user output interface 550 can be combined with the user input interface 520. For example, some such implementations include a touchscreen, a headset including headphones and a microphone, or a joystick with haptic feedback.

In implementations including multiple computing devices, a server of the system or, in a serverless implementation, a peer can use one or more communications networks that facilitate communication among the computing devices to achieve the conversion of text-to-voice/voice-to-text in service of emergency communications, as outlined herein. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, an ASIC, and cache memory, and to transitory storage media, such as carrier waves or propagating signals.

Aspects of the system can be implemented in various manners, e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "module" or a "system." Functions described in this disclosure can be implemented as an algorithm executed by one or more hardware processing units, e.g., the processor 540. In various embodiments, different operations and portions of the operations of the algorithms described can be performed by different processing units. In some implementations, the operations can be achieved by reciprocating software in any of the device 120, the satellite 130, the server 140, and/or the call center 150. Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacture of these devices and systems.

Any suitable permutation can be applied to a physical implementation, including the design of the communications network in which the system is implemented. In one embodiment, the bus 555 can share hardware resources with the memory 530 and the processor 540. In this alternative implementation, the computing device 500 be provided with separate hardware resources including one or more processors and memory elements.

In example implementations, various other components of the computing device 500 can be installed in different physical areas or can be installed as single units.

The communication system can be configured to facilitate communication with machine devices (e.g., vehicle sensors, instruments, electronic control units (ECUs), embedded devices, actuators, displays, etc.) through the bus 555. Other suitable communication interfaces can also be provided for an Internet Protocol (IP) network, a user datagram protocol (UDP) network, or any other suitable protocol or communication architecture enabling network communication with machine devices.

The innovations in this detailed description can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable, non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. A non-transitory, computer-readable storage medium can include instructions to allow one or more processors to carry out the emulation.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other implementations can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. For example, various modifications and changes can be made to the arrangements of components. The description and drawings are, accordingly, to be regarded in an illustrative sense, not in a restrictive sense.

The numerous examples provided herein described interaction in terms of two, three, or more electrical components for purposes of clarity and example. The system can be consolidated in any manner. Along similar design alternatives, the illustrated components, modules, and elements of the drawings can be combined in various possible configurations within the scope of this disclosure. In certain cases, one or more of the functionalities of a given set of flows might be more clearly described by referencing a limited number of electrical elements. The electrical circuits of the drawings are readily scalable and can accommodate many components, as well as more complicated/sophisticated arrangements and configurations. Accordingly, the provided examples do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features can be included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

Examples

In Example M1, a method includes receiving an emergency request, the emergency request including a first text message and a geolocation; determining a call center, at least in part based on the geolocation; converting content of the first text message to a first voice message; and transmitting the first voice message to the call center.

Example M2 is the method of Example M1, further comprising: receiving a registration request identifying a jurisdiction of the call center, wherein the determining is performed at least in part based on the jurisdiction of the call center.

Example M3 is the method of any of Examples M1-M2, further comprising: standardizing the first text message to a key event to extract the content.

Example M4 is the method of Example M2, further comprising: determining a language of the call center, at least in part based on the registration request; and translating the content to the language of the call center, wherein the first voice message is in the language of the call center.

Example M5 is the method of any of Examples M1-M4, further comprising: receiving an emergency response including a second voice message.

Example M6 is the method of Example M5, further comprising: converting the second voice message to a second text message.

Example M7 is the method of Example M6, further comprising: transmitting the second text message to an address, wherein the emergency request identifies the address.

In Example A1, an apparatus includes a network interface that receives an emergency request, the emergency request including a first text message and a geolocation; and a processor configured to determine a call center, at least in part based on the geolocation and to convert content of the first text message to a first voice message, wherein the network interface transmits the first voice message to the call center.

Example A2 is the apparatus of Example A1, wherein the network interface receives a registration request identifying a jurisdiction of the call center, and the processor determines the call center at least in part based on the jurisdiction of the call center.

Example A3 is the apparatus of any of Examples A1-A2, wherein the processor further is configured to standardize the first text message to a key event to extract the content.

Example A4 is the apparatus of Example A2, wherein the processor further is configured to determine a language of the call center, at least in part based on the registration request, and to translate the content to the language of the call center, and the first voice message is in the language of the call center.

Example A5 is the apparatus of any of Examples A1-A4, wherein the network interface receives an emergency response including a second voice message.

Example A6 is the apparatus of Example A5, wherein the processor further is configured to convert the second voice message to a second text message.

Example A7 is the apparatus of Example A6, wherein the network interface transmits the second text message to an address, and the emergency request identifies the address.

In Example C1, a computer-readable medium includes instructions that, when executed by a processor, perform operations comprising: determining a call center, at least in part based on a geolocation, wherein a network interface receives an emergency request, the emergency request including a first text message and the geolocation; and converting content of the first text message to a first voice message, wherein the network interface transmits the first voice message to the call center.

Example C2 is the medium of Example C1, wherein the network interface receives a registration request identifying a jurisdiction of the call center, and the determining is performed at least in part based on the jurisdiction of the call center.

Example C3 is the medium of any of Examples C1-C2, the operations further comprising: standardizing the first text message to a key event to extract the content.

Example C4 is the medium of Example C2, the operations further comprising: determining a language of the call center, at least in part based on the registration request; and translating the content to the language of the call center, wherein the first voice message is in the language of the call center.

Example C5 is the medium of any of Examples C1-C4, wherein the network interface receives an emergency response including a second voice message.

Example C6 is the medium of Example C5, the operations further comprising: converting the second voice message to a second text message.

Example C7 is the medium of Example C6, the operations further comprising: transmitting the second text message to an address, wherein the emergency request identifies the address.

In Example F1, an apparatus includes means for receiving an emergency request, the emergency request including a first text message and a geolocation; means for determining a call center, at least in part based on the geolocation; means for converting content of the first text message to a first voice message; and means for transmitting the first voice message to the call center.

Example F2 is the apparatus of Example F1, further comprising: means for receiving a registration request identifying a jurisdiction of the call center, wherein the determining is performed at least in part based on the jurisdiction of the call center.

Example F3 is the apparatus of any of Examples F1-F2, further comprising: means for standardizing the first text message to a key event to extract the content.

Example F4 is the apparatus of Example F2, further comprising: means for determining a language of the call center, at least in part based on the registration request; and means for translating the content to the language of the call center, wherein the first voice message is in the language of the call center.

Example F5 is the apparatus of any of Examples F1-F4, further comprising: means for receiving an emergency response including a second voice message.

Example F6 is the apparatus of Example F5, further comprising: means for converting the second voice message to a second text message.

Example F7 is the apparatus of Example F6, further comprising: means for transmitting the second text message to an address, wherein the emergency request identifies the address.

We claim:

1. A method, comprising:

receiving an emergency request, the emergency request including a first text message and a geolocation, the emergency request identifying an address;

determining a call center, at least in part based on the geolocation;

determining a key event, at least in part based on the first text message and at least one of a dictionary of key events, a thesaurus of key events, or a database that links words to key events;

standardizing the first text message to a template based on the key event;

converting content of the template to a first voice message;

transmitting the first voice message to the call center;

receiving an emergency response including a second voice message;

converting the second voice message to a second text message; and transmitting the second text message to the address.

2. The method of claim 1, further comprising:

receiving a registration request identifying a jurisdiction of the call center, wherein the determining the call center is performed at least in part based on the jurisdiction of the call center.

3. The method of claim 2, further comprising:

determining a language of the call center, at least in part based on the registration request; and translating the content to the language of the call center, wherein the first voice message is in the language of the call center.

4. An apparatus, comprising:

a network interface that receives an emergency request, the emergency request including a first text message and a geolocation, the emergency request identifying an address; and a processor configured to determine a call center, at least in part based on the geolocation, to determine a key event, at least in part based on the first text message and at least one of a dictionary of key events, a thesaurus of key events, or a database that links words to key events, to standardize the first text message to a template based on the key event, and to convert content of the template to a first voice message, wherein the network interface transmits the first voice message to the call center and receives an emergency response including a second voice message, the processor further is configured to convert the second voice message to a second text message, and the network interface transmits the second text message to the address.

5. The apparatus of claim 4, wherein the network interface receives a registration request identifying a jurisdiction of the call center, and the processor determines the call center at least in part based on the jurisdiction of the call center.

6. The apparatus of claim 5, wherein the processor further is configured to determine a language of the call center, at least in part based on the registration request, and to translate the content to the language of the call center, and the first voice message is in the language of the call center.

7. A non-transitory computer-readable medium including instructions that, when executed by a processor, perform operations comprising:

determining a call center, at least in part based on a geolocation, wherein a network interface receives an emergency request, the emergency request including a first text message and the geolocation, the emergency request identifying an address;

determining a key event, at least in part based on the first text message and at least one of a dictionary of key events, a thesaurus of key events, or a database that links words to key events; and standardizing the first text message to a template based on the key event;

converting content of the template to a first voice message, wherein the network interface transmits the first voice message to the call center and receives an emergency response including a second voice message;

converting the second voice message to a second text message; and transmitting the second text message to the address.

8. The medium of claim 7, wherein the network interface receives a registration request identifying a jurisdiction of the call center, and the determining the call center is performed at least in part based on the jurisdiction of the call center.

9. The medium of claim 8, the operations further comprising:

determining a language of the call center, at least in part based on the registration request; and translating the content to the language of the call center, wherein the first voice message is in the language of the call center.

10. The method of claim 1, further comprising: determining additional fields of the template based on the key event; and determining content of the additional fields by recognizing text in the first text message.

11. The method of claim 1, further comprising: determining whether the first text message relates to an emergency.

12. The method of claim 1, further comprising: determining whether the call center has a capability to receive a text message, wherein the converting is performed responsive to a determination that the call center does not have the capability to receive the text message.

13. The method of claim 1, further comprising: annotating the first voice message with the first text message.

14. The apparatus of claim 4, wherein the geolocation is expressed in Global Navigation Satellite System (GNSS) coordinates.

15. The apparatus of claim 4, wherein the processor is further configured to determine additional fields of the template based on the key event and to determine content of the additional fields by recognizing text in the first text message.

16. The apparatus of claim 4, wherein the processor is further configured to determine whether the first text message relates to an emergency.

17. The apparatus of claim 4, wherein the processor is further configured to edit the second text message to remove speech disfluencies from the second voice message.

18. The medium of claim 7, the operations further comprising: determining additional fields of the template based on the key event; and determining content of the additional fields by recognizing text in the first text message.

19. The medium of claim 7, the operations further comprising: determining whether the first text message relates to an emergency.

20. The medium of claim 7, the operations further comprising: annotating the first voice message with the first text message.

* * * * *